United States Patent
Park et al.

(10) Patent No.: US 8,380,992 B2
(45) Date of Patent: Feb. 19, 2013

(54) DEVICE AND METHOD FOR SECURITY KEY EXCHANGE AND SYSTEM PERTAINING TO SAME

(75) Inventors: Jae-Sung Park, Gunpo-si (KR); Tae-Sung Park, Suwon-si (KR); Jae-Hoon Kwon, Seongnam-si (KR); Sou-Hwan Jung, Seoul (KR); Jae-Duck Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 13/128,106

(22) PCT Filed: Nov. 6, 2009

(86) PCT No.: PCT/KR2009/006532
§ 371 (c)(1),
(2), (4) Date: May 6, 2011

(87) PCT Pub. No.: WO2010/053319
PCT Pub. Date: May 14, 2010

(65) Prior Publication Data
US 2011/0211700 A1 Sep. 1, 2011

(30) Foreign Application Priority Data
Nov. 6, 2008 (KR) .................. 10-2008-0109944

(51) Int. Cl.
*H04L 9/12* (2006.01)
(52) U.S. Cl. ....................... 713/171; 713/169
(58) Field of Classification Search .......... None
See application file for complete search history.

(56) References Cited

U.S. PATENT DOCUMENTS

| | | | | |
|---|---|---|---|---|
| 7,596,697 | B2* | 9/2009 | Sandhu et al. | 713/171 |
| 7,634,091 | B2* | 12/2009 | Zhou et al. | 380/277 |
| 7,660,419 | B1* | 2/2010 | Ho | 380/270 |
| 2005/0078821 | A1 | 4/2005 | Jin et al. | |
| 2008/0229104 | A1 | 9/2008 | Ju et al. | |

FOREIGN PATENT DOCUMENTS

| | | |
|---|---|---|
| KR | 10-0720726 B1 | 5/2007 |
| KR | 10-2008-0051947 A | 6/2008 |

OTHER PUBLICATIONS

Cristiano et al., On Splitting Public Keys for the Public Key Infrastructure, IEEE, 2005.*
Menezes et al., Handbook of Applied Cryptography, 1996, CRC Press, pp. 515-524.*
International Search Report for PCT/KR2009/006532 issued May 31, 2010 [PCT/ISA/210].
Written Opinion for PCT/KR2009/006532 issued May 31, 2010 [PCT/ISA/237].

* cited by examiner

*Primary Examiner* — Minh Dinh
(74) *Attorney, Agent, or Firm* — Sughrue Mion, PLLC

(57) ABSTRACT

The present invention relates to a device and method that enable a security key to be shared using security key exchange between two terminals, and a system that supports the same. To achieve the above, an in-house generated public key is divided into two, said two public keys that have been divided are delivered to counterpart devices via different pathways, and the two public keys delivered from counterpart devices are used to predict the public key of the counterpart device. In addition, said predicted public key is verified, and said verified public key is used to form a master key. Subsequently, said generated master key is verified, and said master key that has been verified is used to exchange data with the counterpart device.

18 Claims, 5 Drawing Sheets

DEVICE AND METHOD FOR SECURITY KEY EXCHANGE AND SYSTEM PERTAINING TO SAME

CROSS REFERENCE TO RELATED APPLICATION

This application claims priority under 35 U.S.C. §119(a) to Korean Patent Application No. 10-2008-0109944 filed on Nov. 6, 2008, the disclosure of which is incorporated herein by reference.

TECHNICAL FIELD

The present invention relates to an apparatus and a method for a security key exchange and a system supporting the same, and more particularly to an apparatus and a method for rendering a security key sharable through a security key exchange between two terminals.

BACKGROUND ART

Advancement of the communication industry has created various value-added services utilizing networks which are represented by the Internet. The network based value-added services permitted many users to easily share information through its collections and deliveries.

Using the network based services frequently involves deliveries of personally classified information which is increasingly vulnerable to be exposed to third parties. Therefore, there is a practical need to provide different protection methods for securing personal information transmitted on the networks.

A generally used security measure of protecting the personal information is to encrypt and send it by a security key prearranged between the sender and the receiver. Other security techniques being used are based on a certificate issued from public offices or others for the purpose of banking and payment services over the Internet.

In the above example to protect the personal information using the security key, the security key for use between the sender and receiver is necessarily prearranged. For this purpose of making an agreement for the usable security key between the parties, there is a required procedure for the key sharing.

This sharing of the security key involves an indispensable procedure of transmitting information needed for the security key sharing to and from the sender and receiver. This may open an opportunity for intermediate attackers or men in the middle attack to snatch the security sharing information off the networks.

So, in order to provide diverse value-added services worry free, a scheme for the security key sharing that can provide the users with a convenience as well as the elimination of an exposure of personal information is urgently needed.

DISCLOSURE

Technical Problem

Therefore, the present disclosure provides an apparatus and a method for exchanging a security key between two terminals with no involvements of an intermediate party.

In addition, the present disclosure provides an apparatus and a method for halving public keys generated independently by respective communication devices before carrying out their data communications and sending the keys to each other via different routes, and a system therefor.

In addition, the present disclosure provides an apparatus and a method for predicting the public key of the counterpart device using a pair of public keys supplied from the counterpart device via the different routes and sending/receiving data by using the predicted public keys, and a system therefor.

In addition, the present disclosure provides an apparatus and a method for authenticating or verifying the predicted public key of the counterpart device provided by using a pair of public keys supplied from the counterpart device via the different routes and performing a verification of a master key acquired from the verified public key.

Technical solution

In accordance with an aspect of the present invention, there is provided a communication system for enabling communication devices for data communication to share security keys, the communication system including: a client device for dividing a public key generated by a communication device into two public key halves; transmitting one of the two divided public key halves in a signaling route to a counterpart communication device; transmitting the other public key half and public information signed by a personal key generated automatically in a media route to the counterpart communication device; predicting a public key generated by the counterpart communication device by using the two public key halves received from the counterpart communication device in the signaling route and the media route; performing a verification of the predicted public key and signed counterpart public information having been received from the counterpart communication device in the media route; and upon a successful verification of the predicted public key and the signed counterpart public information, generating a master key for use in a data communication with the counterpart communication device.

In accordance with an aspect of the present invention, there is provided a method for enabling a client device to share a security key for data communication with a counterpart communication device, the method including steps of: dividing a public key generated by the client device into two public key halves; transmitting one of the two divided public key halves in a signaling route to the counterpart communication device; transmitting the other public key half and public information signed by a personal key generated automatically in a media route to the counterpart communication device; predicting a public key generated automatically in the counterpart communication device by using the two public key halves received from the counterpart communication device through the signaling route and the media route; performing a verification of the predicted public key and signed counterpart public information having been received from the counterpart communication device in the media route; and upon a successful verification of the predicted public key and the signed counterpart public information, generating a master key for use in a data communication with the counterpart communication device.

Advantageous Effects

This disclosure can advantageously divide a public key agreed between two communicating terminals and transmit the key portions in different routs around the interceptor attacks.

In addition, the disclosure is advantageously adaptable to the current VoIP environment by performing the key exchange using the generated personal keys and public keys privately between two terminals.

Furthermore, the disclosure has an advantage of allowing a direct key verification to be performed between two terminals requiring no authentication of the public keys by the users themselves.

BEST MODE

Mode for Invention

Figure 1:
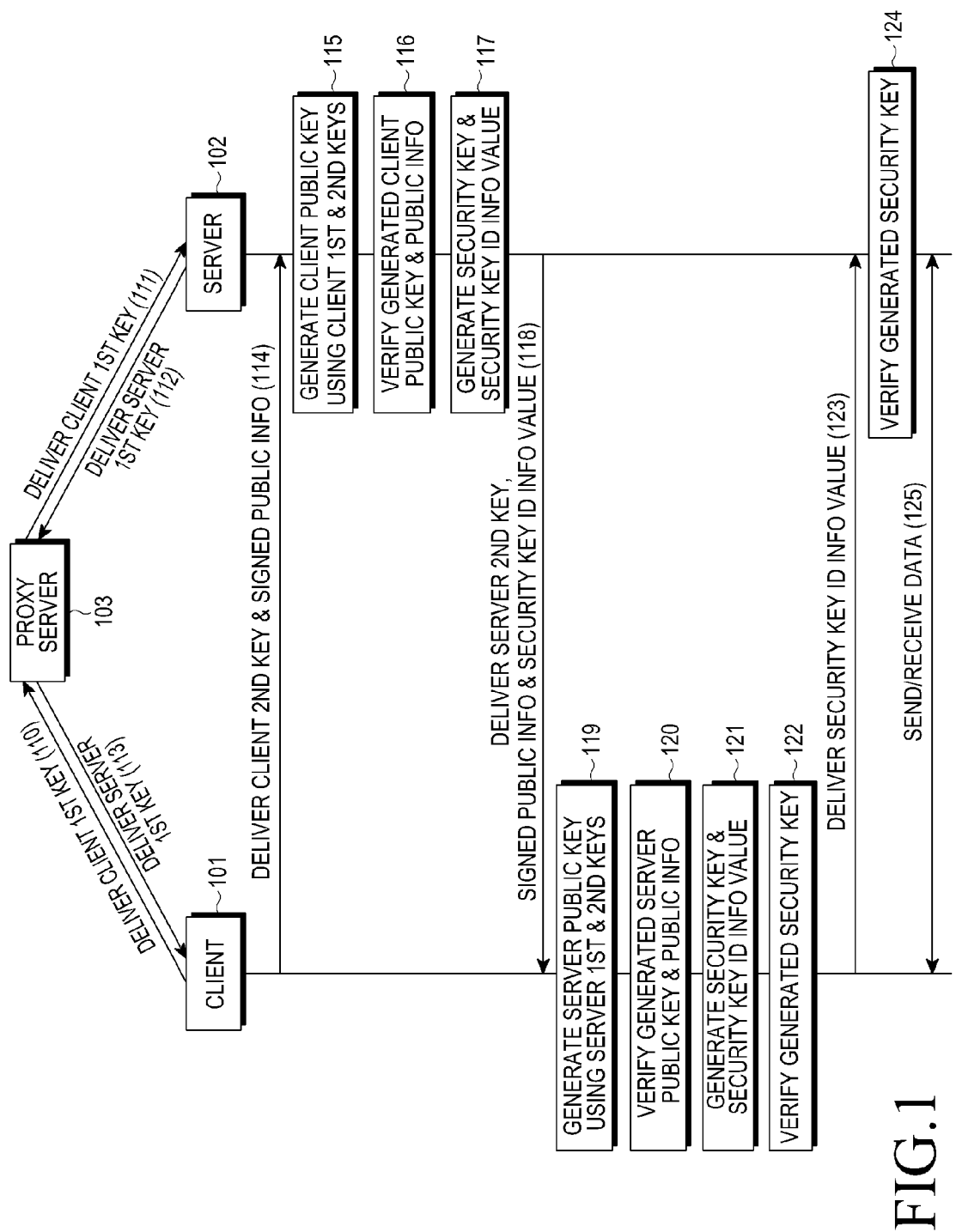
FIG. 1 is a general flow diagram for a key exchange in a key exchange system according to an embodiment of the present invention.

In the following description of the present disclosure, a detailed description of relevant known functions and configurations incorporated herein will be omitted when it may make the subject matter of the present disclosure rather unclear. In addition, the terms used hereinafter are defined with the functions in the disclosure considered and are changeable depending on the user's or operator's intent or practice. So, the definitions should be interpreted based on the overall context of the present disclosure.

The representative security key exchange techniques available for safeguarding personal information on the voice over Internet protocol (VoIP) network are user terminal key exchange techniques for operating a secure real-time transport protocol (SRTP). The SRTP security key exchange techniques are classified into a method using just a signaling route, a method using just a media route, and a method using both of the signaling route and the media route.

The first method using just the signaling route includes the techniques of MIKEY-NULL (Multimedia Internet KEYing-NULL), MIKEY-PSK (MIKEY-Pre-Shared Key), MIKEY-RSA (MIKEY-Rivest Shamir Adleman), MIKEY-RSA-R (MIKEY-RSA-Reverse), MIKEY-DHSIGN (MIKEY-DH SIGNature), MIKEY-DHHMAC (MIKEY-DH Hash Message Authentication Code), and SDP (Security Descriptions for Media Streams).

However, the method using just the signaling route is difficult to apply actually to VoIP services and others for their need of the signaling already served with a security or previously shared security information or a certificate.

Secondly, the method using just the media route is offered by a ZRTP technique which uses a Diffie-Hellman key exchange technique to have the key for the SRTP shared between the opposite terminals and lets a user voices the short words associated with the resultant value of the Diffie-Hellman for the purpose of authentication.

However, such method using just the media route necessarily involves the individual user in the cumbersome attempts to perform the authentication.

Thirdly, the method using both of the signaling route and the media route is offered by DTLS-SRTP (datagram transport layer security-SRTP) technique.

This technique is based on PKI (public key infrastructure) generally using certificates and performs the DTLS steps to exchange the SRTP key.

Other than the PKI base using the certificates, the technique attempts to exchange the SRTP key by means of a self-signed certificate using both the signaling route and the media route.

This method transmits a feature (fingerprint) of the public key to SDP (session description protocol) of the signaling route, and transmits the self-signed certificate as it carries out the DTLS in the media route. As a protection of the transmitted public key feature (fingerprint), a security technique called 'Enhancements for authenticated identity management in the SIP' is used midway through the transmission route for a proxy server to add the signature value for the fingerprint.

In the meantime, the user takes advantage of the public key feature (fingerprint) received via the signaling route to authenticate the sender's self-signed certificate.

As described above, it has been necessary in the typical SRTP based key exchange techniques to use the certificates involving a third organization or to have the users' personal involvements.

Therefore, in the embodiments of the present invention in the following description, there is provided a solution to protect the sent/received data through a security key exchange and its verification directly or privately between two data communication devices.

In the embodiment of the present invention for this purpose, the two data communication devices are adapted to share one of two public key halves from their privately generated public key, through the signaling route. In addition, the two data communication devices share public information that is signed by the other one of two public key halves and a personal key, through the media route. Here, the personal key is independently generated along with the public key by the corresponding device.

Each of the two data communication devices predicts the public key generated by its counterpart device using two public keys delivered from its counterpart device, and performs verification with respect to the predicted public key and the signed public information received from the counterpart device.

Then, each of the two data communication devices, in response to a successful verification of the predicted public key and the signed public information from the counterpart device, generates a master key and master key identification information, and sends the generated master key identification information to the counterpart device. Using the master key identification information received from the counterpart device, each of the two data communication devices performs a verification of its own generation of master key, and in response to a success of the verification, uses its own master key send/receive data.

In the following is a detailed description on the presently suggested security key exchange method with reference to the attached drawings.

FIG. 1 is a general flow diagram for a security key exchange in a security key exchange system according to an embodiment of the present invention.

The security key exchange system according to an embodiment of the present invention includes a client device 101, a server 102, and a proxy server 103. By this chance, the embodiment of the present invention will recite the client device 101 abbreviated to denote apparatuses operating as a user agent client and the server 102 to denote a client operating as a user agent server. In addition, the client device 101 and server 102 are differently identified in the description for the sake of convenience. However, it will be obvious to the readers that the operation of the client device 101 in this embodiment may be carried out using the server 102 and vice versa.

Further, the proxy server 103 in the embodiment of the present invention is a kind of communication server for setting a signaling route between the client device 101 and server 102.

The client device 101 independently generates an RSA personal key and an RSA public key. The server 102 also generates an RSA personal key and an RSA public key on its own. Then, in order to divide their respective RSA public keys, the client device 101 and server 102 generate arbitrary Diffie-Hellman secure values, and use these generated values to calculate Diffie-Hellman public information. In addition, the client device 101 and server 102 respectively use the calculated Diffie-Hellman public information to divide or halve their RSA public keys into first RSA public keys (hereinafter called "first public key half") and second RSA public keys (hereinafter called "second public key half").

Next in step 110, the client device 101 delivers its first public key half to the proxy server 103 via the signaling route. The proxy server 103 in step 111 relays the first public key half received from the client device 101 to the server 102 via the signaling route.

Meanwhile, the server 102 delivers its first public key half to the proxy server 103 via the signaling route in step 112. The proxy server 103 in step 113 relays the first public key half received from the server 102 to the client device 101 via the signaling route.

The client device 101 in step 114 signs previously calculated Diffie-Hellman public information by using its own RSA personal key, and delivers its own public key half and the signed Diffie-Hellman public information directly to the server 102. At this time, the client device 101 also sends Diffie-Hellman public information lacking a signature by the RSA personal key.

This allows the server 102 to acquire the first public key half of the client device 101, its second public key half, the signed Diffie-Hellman public information, and the unsigned Diffie-Hellman public information.

In step 115, the server 102 generates an RSA public key of the client device 101 by using the previously acquired first and second public key halves of the client device 101.

Additionally in step 116, the server 102 performs a verification process of whether the server-generated RSA public key of the client device 101 is identical to the RSA public key generated by the client device 101. In addition, the server 102 uses the verified RSA public key of the client device 101 to perform a verification on the earlier signed and acquired Diffie-Hellman public information of the client device 101.

Upon successful completion of the verification of the server-generated RSA public key of the client device 101 and the signed Diffie-Hellman public information of the client device 101, the server 102 in step 117 generates a security master key, and uses public parameter values required for the generation of the security master key to generate the value of security master key identification information. In step 118, the server 102 uses its own RSA personal key to sign the earlier calculated Diffie-Hellman public information, and sends its own second public key half, the signed Diffie-Hellman public information, the earlier generated security master key, and the value of security master key identification information to the client device 101 via the media route. At the same time, the server 102 also sends the unsigned Diffie-Hellman public information.

In step 119, the client device 101 generates the RSA public key of the server 101 by using the first and second public key halves delivered from the server 102.

Next in step 120, the client device 101 performs a verification process of whether the server-generated RSA public key of the server 102 is identical to the RSA public key actually generated by the server 102. In addition, the client device 101 uses the verified RSA public key of the server 102 to perform a verification on the earlier signed and acquired Diffie-Hellman public information of the server 102.

Upon successful completion of the verification of the server-generated RSA public key of the server 102 and the earlier signed and acquired Diffie-Hellman public information of the server 102, the client device 101 in step 121 generates a security master key, and uses public parameter values required for the generation of the security master key to generate the value of security master key identification information.

By using the security master key received from the server 102 and the value of security master key identification information generated by the client device 101, the client device 101 verifies whether the security master key generated by the server 102 is a normal value.

When the security master key generated by the server 102 is verified as a normal value, step 123 delivers the earlier generated value of the security master key identification information to the server 102.

Upon receiving the value of the security master key identification information from the client device 101, the server 102 in step 124 uses the received value of the security master key identification information of the client device 101 and its own generation of the value of the security master key identification information to verify if the former is a normal value.

If the security master key generated by the client device 101 is verified a normal value, the server 102 recognizes that the same one as its own generation of security master key was generated by the client device 101.

Upon completion of the verifications of the generated security master keys between the client device 101 and server 101, step 125 uses the corresponding security master key for sending or receiving data.

Typically in the case of exchanging keys between two users without an intervention of a third party, the security master key was susceptible to an exposure to a man in the middle attack or MITM. To deal with such middle attackers, the ZRTP technique has had the users carry out actions in person for the authentication in short authentication string (SAS) method. This required the users to actually do some jobs to complete the authentication.

However, according to the present disclosure as above, the public keys between the client device and the server are halved and exchanged in two different routes and hence the public keys can be prevented from being exposed by the middle attackers. Besides, the users are saved from having to personally involve in the exchange of the security key between the client device and the server and its verifying activity.

Figure 2:
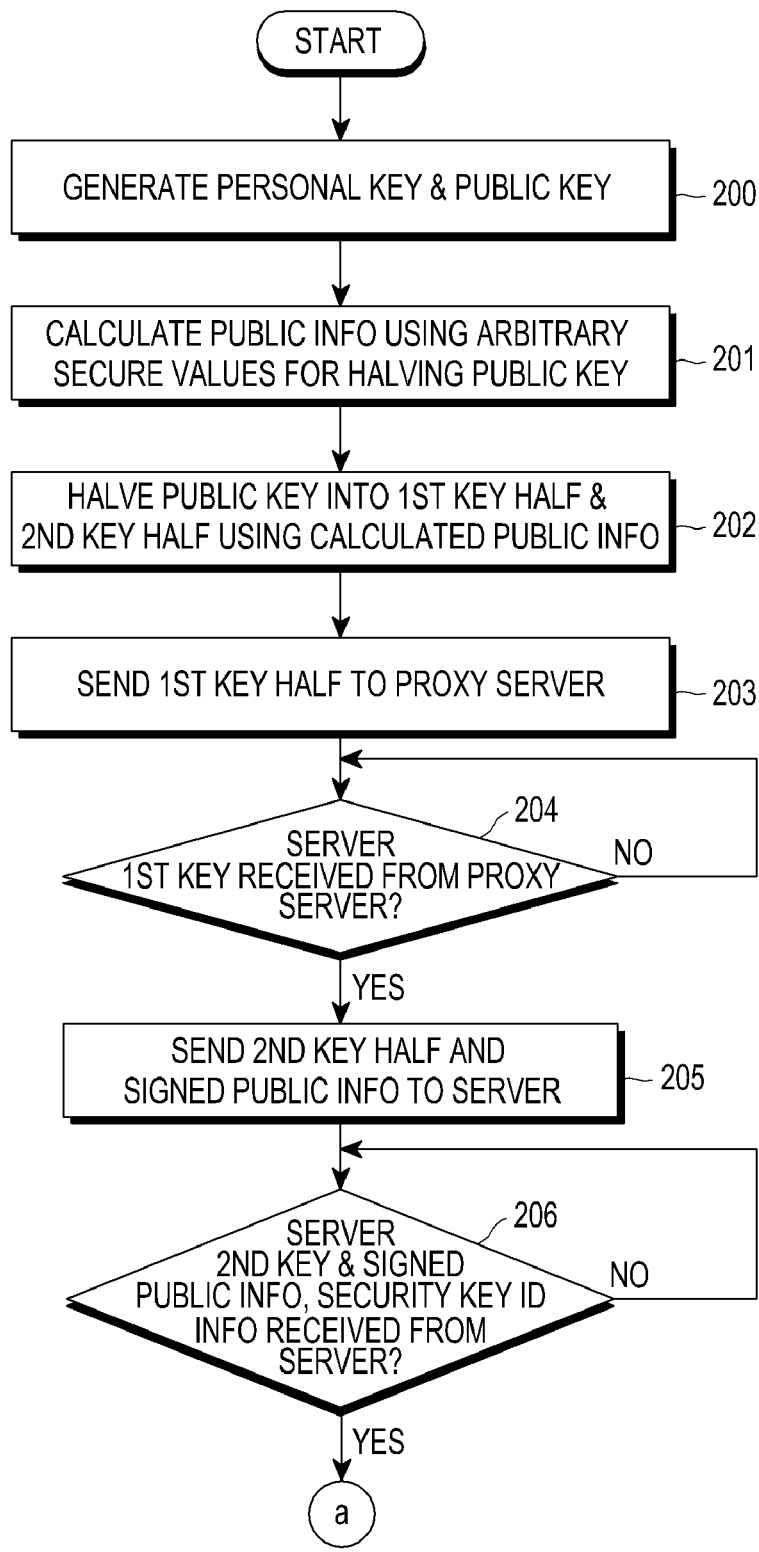
FIG. 2 is a control flow diagram for illustrating a client to transmit the public key in sections to a proxy server and a server according to an embodiment of the present invention.
Figure 3:
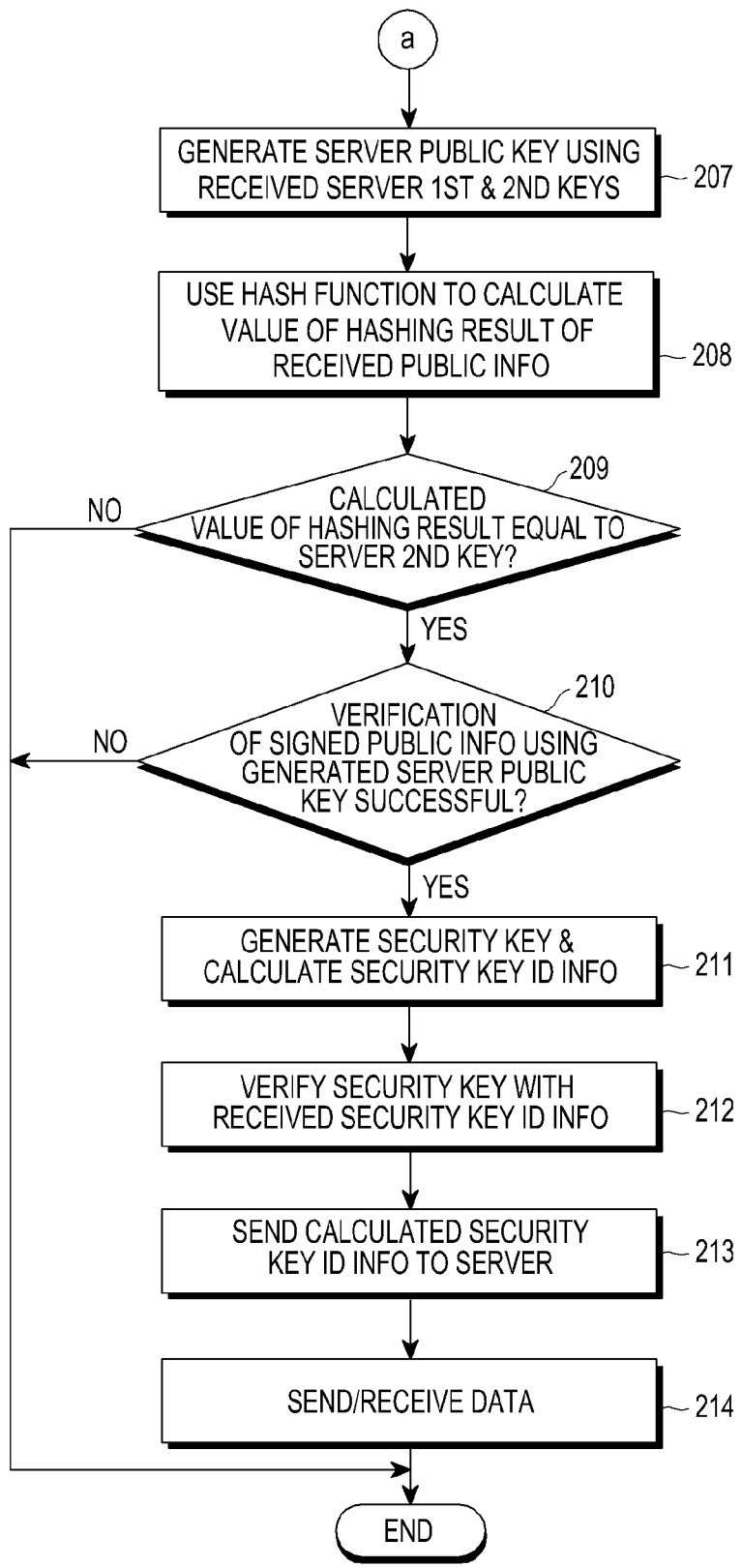
FIG. 3 is a control flow diagram for illustrating the client to generate and verify the public key by using a first server public key half and a second server pubic key half received from the server according to an embodiment of the present invention.

FIGS. 2 and 3 illustrate a control flow performed in the client device for exchanging the security key according to an embodiment of the present invention.

Referring to FIGS. 2 and 3, the client device 200 in step 200 generates its personal key and public key. For example, it is assumed that the personal key generated by the client device 101 is $PK_{Alice}^{-}$ and its public key is $PK_{Alice}^{+}$ In addition, the personal key generated by the server 102 is assumed to be $PK_{Bob}^{-}$, and its public key is $PK_{Bob}^{+}$.

In step 201, the client device 101 calculates the Diffie-Hellman public information for use in halving its own generated public key $PK_{Alice}^{+}$. The above Diffie-Hellman public information may be calculated by arbitrary Diffie-Hellman secure values. The arbitrary Diffie-Hellman secure values are generated by the client device 101.

For example, when the generated arbitrary Diffie-Hellman secure value is x, Diffie-Hellman Diffie-Hellman public information (DHPartAlice) calculated using the arbitrary Diffie-Hellman secure value x may be defined as $g^x \bmod p$. Here, g represents a generator, mod is a modular operator, and p (prime number) means large prime numbers that can be divided only by 1 and its own number of p.

In step 202, the client device 101 uses the earlier generated Diffie-Hellman public information $g^x \bmod p$ to divide the public key $PK_{Alice}^{+}$ into a first public key half $PK_{Alice\_1}^{+}$ and a second key half $PK_{Alice\_2}^{+}$.

Equation 1 below defines the public key $PK_{Alice}^{+}$ which is divided into the first public key half $PK_{Alice\_1}^{+}$ and the second public key half of $PK_{Alice\_2}^{+}$.

$$PK_{Alice\_2}^{+}=H(g^x \bmod p)$$

$$PK_{Alice\_1}^{+}=PK_{Alice}^{+} \oplus PK_{Alice\_2}^{+} \quad \text{[Equation 1]}$$

Based on Equation 1, the second public key half $PK_{Alice\_2}^{+}$ may be obtained by having the earlier generated Diffie-Hellman public information $g^x \bmod p$ subject to SHA1 has function (H). At this time, in order to equalize the quantity of the second public key half $PK_{Alice\_2}^{+}$ to the quantity of the RSA public key $PK_{Alice}^{+}$, the second public key half $PK_{Alice\_2}^{+}$ is subject to a padding with 0.

In addition, the first public key half $PK_{Alice\_1}^{+}$ may be obtained using the RSA public key $PK_{Alice}^{+}$ and the second public key half $PK_{Alice\_2}^{+}$ by running them through XOR or exclusive OR $PK_{Alice}^{+} \oplus PK_{Alice\_2}^{+}$.

In step 203, the client device 101 inserts the first public key half $PK_{Alice\_1}^{+}$ into a session attribute field which is present in SDP of a SIP message INVITE and then send the result to the proxy server 103 via the signaling route.

In step 204, the client device 101 checks whether there is a receipt, from the proxy server 103 through the signaling route, of the first public key half $PK_{Bob\_1}^{+}$.

If the client device 101 is in receipt, through the signaling route, of the first public key half $PK_{Bob\_1}^{+}$ the server 102, then in step 205, it uses its own personal key $PK_{Alice}^{-}$ to sign the previously calculated Diffie-Hellman public information $g^x \bmod p$. Then, it transmits the above signed Diffie-Hellman public information $Sign_{PK_{Alice}}(g^x \bmod p)$ and the second public key half $PK_{Alice\_2}^{+}$ to the server 102 via an RTP session that is the media route by using the RTP address and the port number included in INVITE and 200 OK message. At this time, the client device 101 sends Diffie-Hellman public information $g^x \bmod p$, which is not signed by the personal key $PK_{Alice}^{-}$ to the server 102 via the media route.

Meanwhile, the client device 101 in step 206 checks whether there is a receipt, from the server 102, of the signed Diffie-Hellman public information $Sign_{PK_{Bob}}(g^y \bmod p)$, the second public key half $PK_{Bob\_2}^{+}$, and the value of security key identification information $H(g^{xy} \bmod p, g^y \bmod p \| g^x \bmod p)$. At the same time, the client device 101 also checks whether there is a receipt, from the server 102, of unsigned Diffie-Hellman public information $g^y \bmod p$.

Upon receipt of the desired information from the server 102, the client device 101 in step 207 uses the received first public key half $PK_{Bob\_1}^{+}$ from the server 102 and the second public key half $PK_{Bob\_2}^{+}$ to calculate the generated public key $PK_{Bob}^{+}$ by the server 102.

For example, the client device 101 may produce the public key $PK_{Bob}^{+}$ generated by the server 102, using Equation 2 below.

$$PK_{Bob}^{+}=PK_{Bob\_1}^{+} \oplus PK_{Bob\_2}^{+} \quad \text{[Equation 2]}$$

By Equation 2, the client device 101 may predict $PK_{Bob}^{+}$, which could have been generated by the server 102, by an XOR operation on the first public key half $PK_{Bob\_1}^{+}$ and the second public key half $PK_{Bob\_2}^{+}$ received from the server 102 via two different routes.

Meanwhile, the client device 101 in step 208 uses the hash function to calculate a hash result value $g^y \bmod p$ of the Diffie-Hellman public information received from the server 102.

Then, the client device 101 in step 209 performs a verification of the predicted server public key $PK_{Bob}^{+}$. The verification is performed depending on whether the calculated hash result value is identical to the second public key half $PK_{Bob\_2}^{+}$ received from the server 102.

This may be determined as in Equation 3 below if the received Diffie-Hellman public information from the server 102 of $g^y \bmod p$ with the hash function H applied calculates the second server public key $PK_{Bob\_2}^{+}$.

$$H(g^y \bmod p)=PK_{Bob\_2}^{+} \quad \text{[Equation 3]}$$

The client device 101 performs step 210 if the calculated hash result value is equal to the received second public key half $PK_{Bob\_2}^{+}$ from server 102. However, if there is no equality between the calculated hash result value and the received second public key half $PK_{Bob\_2}^{+}$ from server 102, then the client device 101 determines that an intermediate attacker changed the public key and terminates the key exchange process.

When the verification is completed for the predicted server public key $PK_{Bob}^{+}$, the client device 101 in step 210 uses the same predicted server public key $PK_{Bob}^{+}$ to verify the signed and received Diffie-Hellman public information from the server 102 $Sign_{PK_{Bob}}(g^y \bmod p)$.

At this time, signed and received Diffie-Hellman public information from the server 102 $Sign_{PK_{Bob}}(g^y \bmod p)$ may be verified by Equation 4 below.

$$Verify_{PK_{Bob}^{+}}(Sign_{PK_{Bob}}(g^y \bmod p)) \quad \text{[Equation 4]}$$

By Equation 4, the Diffie-Hellman public information $Sign_{PK_{Bob}}(g^y \bmod p)$ signed by the independently generated personal key $PK_{Bob}^{-}$ by the server 102 may be verified by using the public key $PK_{Bob}^{+}$ of the server 102.

By the above description, if the client device 101 fails to verify the signed and received Diffie-Hellman public information $Sign_{PK_{Bob}}(g^y \bmod p)$ from the server 102, it determines that an intermediate attacker changed the signed Diffie-Hellman public information and terminates the key exchange process. However, if the client device 101 successfully verifies the signed and received Diffie-Hellman public information $Sign_{PK_{Bob}}(g^y \bmod p)$ from the server 102, it proceeds to step 211.

The client device 101 in step 211 uses Equation 5 to generate a security master key.

$$MK = (g^y \bmod p)^x \bmod p = (g^x \bmod p)^y \bmod p$$
$$= g^{yx} \bmod p = g^{xy} \bmod p \qquad \text{[Equation 5]}$$

Here, radix g is a constructor, one of indices is y or a secure value of the server 102, and the remaining index x represents a secure value of the client device 101. In addition, p represents large prime numbers and mod means a modular operation.

Further, to cross check with the server 102 for the identity of the generated security master key, the client device 101 generates security master key identification information $H(g^{xy} \bmod p, g^y \bmod p \| g^x \bmod p)$. Here, the security master key identification information may be calculated by having the security master key $g^{yz} \bmod p$ and required public parameter values for generating the security master key $g^x \bmod p$ and $g^y \bmod p$ subject to hash function.

Meanwhile, the client device 101 in step 212 performs verification on the security master key $g^{yz} \bmod p$. The generated security master key $g^{yz} \bmod p$ may be verified by using the received security master key identification information from the server 102 $H(g^{xy} \bmod p, g^y \bmod p \| g^x \bmod p)$.

This can be generalized by Equation 6 below.

$$\text{Check}(H(g^{xy} \bmod p, g^y \bmod p \| g^x \bmod p)) \qquad \text{[Equation 6]}$$

To verify the generated security master key $g^{yz} \bmod p$, the client device 101 compares between the previously calculated security master key identification information $H(g^{xy} \bmod p, g^y \bmod p \| g^x \bmod p)$ and the security master key identification information $H(g^{xy} \bmod p, g^y \bmod p \| g^x \bmod p)$ received from the server 102.

When the calculated security master key identification information is identical to the received security master key identification information received from the server 102, the client device 101 determines that the generated security master key is same as the generated master key by the server 102. However, when the calculated security master key identification information is not identical to the received security master key identification information received from the server 102, the client device 101 determines that an intermediate attacker changed the received security master key identification information from the server 102.

Upon completion of the verification with respect to the master key, the client device 101 in step 213 sends newly calculated security master key identification information $H(g^{yx} \bmod p, g^x \bmod p \| g^y \bmod p)$ to the server 102.

At the completion of the verification of the security master key as described above, the client device 101 in step 214 uses the verified security master key to perform sending/receiving data to and from the server 102.

As is clearly described, the client device 101 advantageously divides its own public key and sends the key halves via two different routes and hence safeguards the public key from being exposed even at the receipt of an attack from the intermediate perpetrator.

Figure 4:
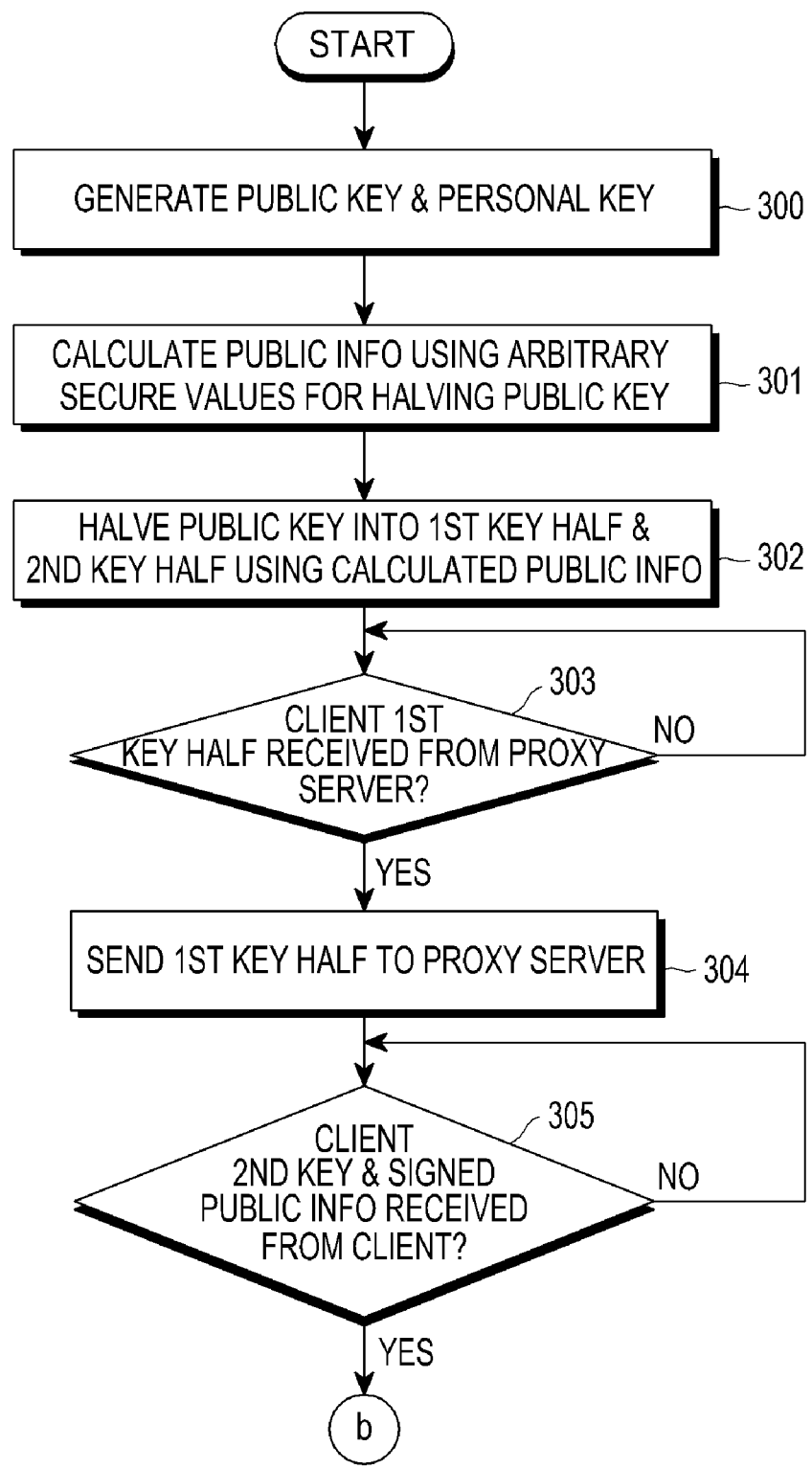
FIG. 4 is a control flow diagram for illustrating the server to transmit the public key in sections to the proxy server and the client according to an embodiment of the present invention.
Figure 5:
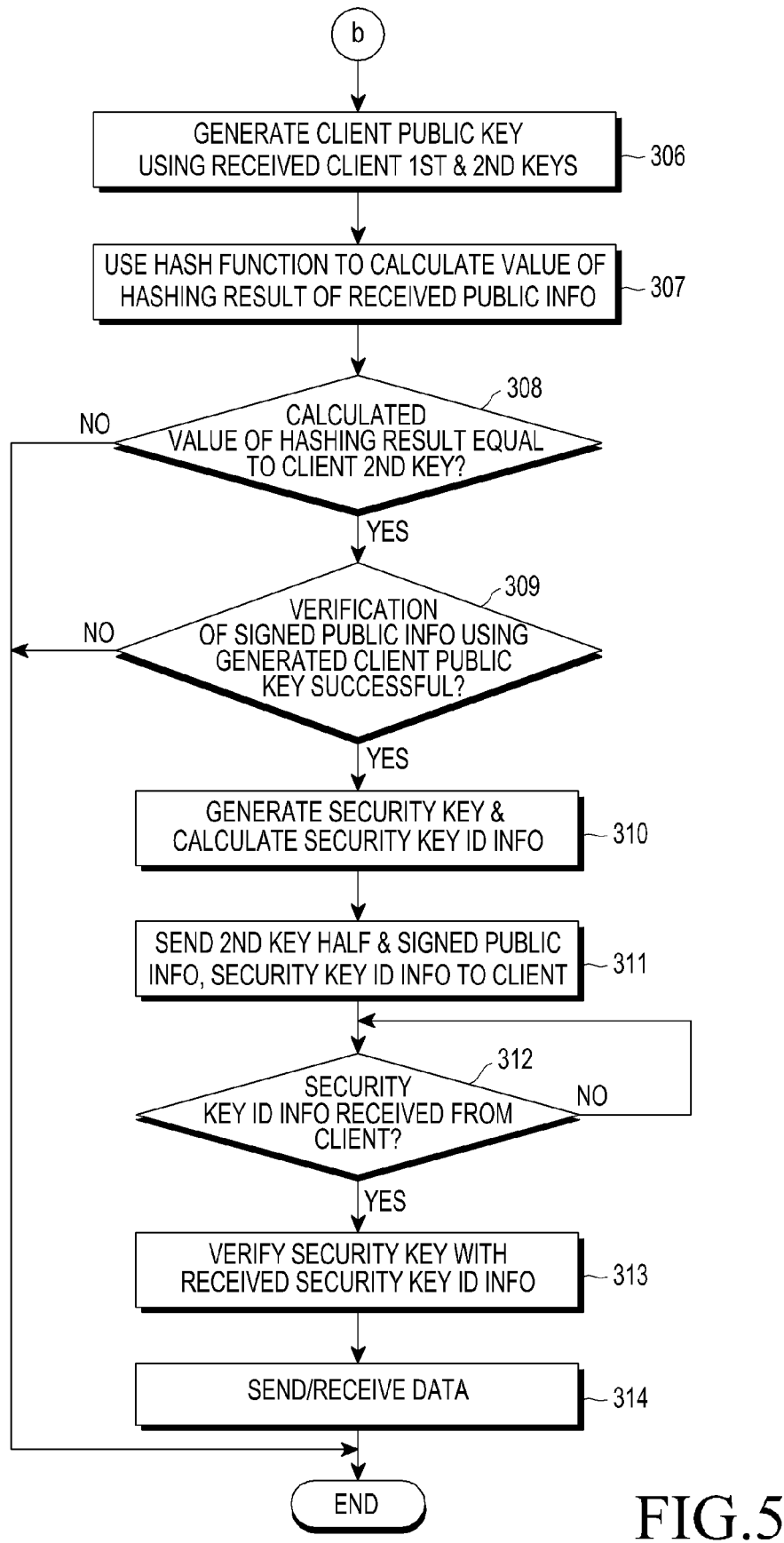
FIG. 5 is a control flow diagram for illustrating the server to generate and verify the public key by using a first client public key half and a second client pubic key half received from the client according to an embodiment of the present invention.

FIGS. 4 and 5 illustrate control flows carried out by the server for exchanging the security key.

Referring to FIGS. 4 and 5, in step 300, the server 102 generates its own personal key $PK_{Bob}^-$ and a public key $PK_{Bob}^+$.

In step 301, the server 102 generates Diffie-Hellman public information for use in dividing its own generated public key $PK_{Bob}^+$. The Diffie-Hellman public information may be calculated by using arbitrary Diffie-Hellman secure values y. The arbitrary Diffie-Hellman secure values y is generated by the server 102.

At this time, the calculated Diffie-Hellman public information (DHPartBob) may be defined by $g^y \bmod p$.

In step 302, the server 102 uses the previously generated Diffie-Hellman public information $g^y \bmod p$ to divide the public key $PK_{Bob}^+$ into a first public key half $PK_{Bob\_1}^+$ and a second public key half $PK_{Bob\_2}^+$.

Equation 7 below defines the divisions of the public key $PK_{Bob}^+$ into the first public key half $PK_{Bob\_1}^+$ and the second public key half $PK_{Bob\_2}^+$.

$$PK_{Bob\_2}^+ = H(g^y \bmod p)$$

$$PK_{Bob\_1}^+ = PK_{Bob}^+ \oplus PK_{Bob\_2}^+ \qquad \text{[Equation 7]}$$

Based on Equation 7, the second public key half $PK_{Bob\_2}^+$ may be obtained by having the earlier generated Diffie-Hellman public information $g^x \bmod p$ subject to SHA1 hash function (H). At this time, in order to equalize the quantity of the second public key half $PK_{Bob\_2}^+$ to the quantity of the RSA public key $PK_{Bob}^+$ the second public key half $PK_{Bob\_2}^+$ is subject to a padding with 0.

In addition, the first public key half $PK_{Bob\_1}^+$ may be obtained using the RSA public key $PK_{Bob}^+$ and the second public key half $PK_{Bob\_2}^+$ by running them through XOR or exclusive OR $PK_{Bob}^+ \oplus PK_{Bob\_2}^+$.

In step 303, the server 102 checks whether there is a receipt, from the proxy server 103 through the signaling route, of the first public key half $PK_{Alice\_1}^+$.

If the server 102 receives from the proxy server 103 through the signaling route, the first public key half of the client device 101 $PK_{Alice\_1}^+$ the server 102 in step 304 inserts the first public key half $PK_{Bob\_1}^+$ into a session attribute field which is present in SDP of a SIP message 200 OK and then send the result to the proxy server 103 via the signaling route.

In addition, the server 102 in step 305 checks whether there are receipts from the client device 101, of signed Diffie-Hellman public information $\text{Sign}_{PK_{Alice}}(g^x \bmod p)$ and the second public key half $PK_{Alice\_2}^+$. At the same time, the server 102 also checks whether there is a receipt, from the client device 101, of unsigned Diffie-Hellman public information $g^y \bmod p$.

Upon receipt of the desired information from the client device 101, the server 102 in step 306 uses the received first public key half $PK_{Alice\_1}^+$ and the second public key half $PK_{Alice\_2}^+$ to calculate the generated public key $PK_{Alice}^+$ by the client device 101.

For example, the server 102 may produce the generated public key by the client device 101 using Equation 8 below, which is $PK_{Alice}^+$.

$$PK_{Alice}^+ = PK_{Alice\_1}^+ \oplus PK_{Alice\_2}^+ \qquad \text{[Equation 8]}$$

By Equation 8, the server 102 may predict a possible generation by the client device 101 of $PK_{Alice}^+$ that could have been available by an XOR operation on the first public key half $PK_{Alice\_1}^+$ received from the client device 101 via two different routes and the second public key half $PK_{Alice\_2}^+$.

Meanwhile, the client device 101 in step 307 uses the hash function to calculate a hash result value $g^y \bmod p$ of the Diffie-Hellman public information received from the client device 101.

Then, the server 102 in step 308 performs a verification of the predicted client device public key $PK_{Alice}^+$. The verification is performed depending on whether the calculated hash result value is identical to the second public key half $PK_{Alice\_2}^+$ received from the client device 101.

This may be determined as in Equation 9 below if the received Diffie-Hellman public information from the client device 101 of $g^x$ mod P with the hash function H applied calculates the second server public key $PK_{Alice\_2}^+$.

$$H(g^x \bmod p) = PK_{Alice\_2}^+ \qquad \text{[Equation 9]}$$

The server 102 performs step 309 if the calculated hash result value is equal to the received second public key half $PK_{Alice\_2}^+$ from the client device 101. However, if there is no equality between the calculated hash result value and the received second public key half $PK_{Alice\_2}^+$ from the client device 101, then the server 102 determines that an intermediate attacker changed the public key and terminates the key exchange process.

When the verification is completed for the predicted client device public key $PK_{Alice}^+$, the server 102 in step 309 uses the same predicted client device public key $PK_{Alice}^+$ to verify the signed and received Diffie-Hellman public information from the client device 101 $Sign_{PK_{Alice}^-}(g^x \bmod p)$.

At this time, signed and received Diffie-Hellman public information from the client device 101 $Sign_{PK_{Alice}^-}(g^x \bmod p)$ may be verified by Equation 10 below.

$$Verify_{PK_{Alice}^+}(Sign_{PK_{Alice}^-}(g^x \bmod p)) \qquad \text{[Equation 10]}$$

By Equation 10, the Diffie-Hellman public information $Sign_{PK_{Alice}^-}(g^x \bmod p)$ signed by the personal key $PK_{Alice}^-$ independently generated by the client device 101 may be verified by using the public key $PK_{Alice}^+$ the client device 101.

By the above description, if the server 102 fails to verify the signed and received Diffie-Hellman public information $Sign_{PK_{Alice}^-}(g^x \bmod p)$ from the client device 101, it determines that an intermediate attacker changed the signed Diffie-Hellman public information and terminates the key exchange process. However, if the server 102 successfully verifies the signed and received Diffie-Hellman public information $Sign_{PK_{Alice}^-}(g^x \bmod p)$ from the client device 101, it proceeds to step 310.

The server 102 in step 310 uses Equation 11 to generate a security master key.

$$MK = (g^x \bmod p)^y \bmod p = (g^y \bmod p)^x \bmod p \qquad \text{[Equation 11]}$$
$$= g^{xy} \bmod p = g^{yx} \bmod p$$

Here, in $g^{xy}$ radix g is a constructor, one of indices is y or a secure value of the server 102, and the remaining index x represents a secure value of the client device 101. In addition, p represents large prime numbers and mod means a modular operation.

Further, to cross check with the client device 101 for the identity of the generated security master key, the server 102 generates security master key identification information $H(g^{xy} \bmod p, g^y \bmod p \| g^x \bmod p)$. Here, the security master key identification information may be calculated by having the security master key $g^{xy}$ mod p and required public parameter values for generating the security master key $g^x$ mod p and $g^y$ mod p subject to a hash function.

Upon generating the security master key identification information, the server 102 in step 311 its own personal key $PK_{Bob}^-$ the earlier generated Diffie-Hellman public information $g^y$ mod p. Then, it transmits the above signed Diffie-Hellman public information Sign $Sign_{PK_{Bob}^-}(g^y \bmod p)$, the second public key half $PK_{Bob\_2}^+$, and its own security master key identification value $H(g^{xy} \bmod p, g^y \bmod p \| g^x \bmod p)$ to the client device 101 via a RTP session that is the media route by using the RTP address and the port number included in INVITE and 200 OK message. At this time, the server 102 sends Diffie-Hellman public information $g^y$ mod p which is not signed by the personal key $PK_{Bob}^-$ to the client device 101 via the media route.

Meanwhile, the server 102 in step 312 checks whether there is a receipt, from the client device 101, of the security master key identification information $H(g^{xy} \bmod p, g^y \bmod p \| g^x \bmod p)$.

On the other hand, the server 102 in step 313 performs verification on the generated security master key $g^{xy}$ mod p. The generated security master key $g^{xy}$ mod p may be verified by using the received security master key identification information $H(g^{yx} \bmod p, g^x \bmod p \| g^y \bmod p)$ from the client device 101.

This can be generalized by Equation 12 below.

$$Check(H(g^{yx} \bmod p, g^x \bmod p \| g^y \bmod p)) \qquad \text{[Equation 12]}$$

To verify the generated security master key $g^{xy}$ mod p, the sever 102 compares between the newly calculated security master key identification information $H(g^{yx} \bmod p, g^x \bmod p \| g^y \bmod p)$ and the received security master key identification information $H(g^{yx} \bmod p, g^x \bmod p \| g^y \bmod p)$ from the client device 101.

When the calculated security master key identification information is identical to the received security master key identification information from the client device 101, the server 102 determines that the generated security master key is same as the generated master key by the client device 101. However, when the calculated security master key identification information is not identical to the received security master key identification information from the client device 101, the server 102 determines that an intermediate attacker changed the received security master key identification information from the client device 101.

Upon completion of the verification with respect to the master key, the server 102 in step 314 performs sending/receiving data to and from the client device 101 using the verified security master key.

As described, through dividing its own public key and sending the key halves via two different routes to the client device 101, the public key is advantageously shielded from an exposure to a possible attack by an intermediate attacker.

According to the embodiments of the present invention, each of the public keys between the user terminals are halved and exchanged via separate routes and thus a public key half under attack from an intermediate attacker is still capable of achieving a secure key exchange between the terminals.

The invention claimed is:

1. A communication system for enabling communication devices for data communication to share security keys, the communication system comprising:
  a client device for dividing a public key generated by a communication device into two public key halves;
  transmitting one of the two divided public key halves in a signaling route to a counterpart communication device;
  transmitting the other public key half and public information signed by a personal key generated automatically in a media route to the counterpart communication device;
  predicting a public key generated by the counterpart communication device by using two public key halves received from the counterpart communication device in the signaling route and the media route;
  performing a verification of the predicted public key and signed counterpart public information having been received from the counterpart communication device in the media route; and upon a successful verification of the predicted public key and the signed counterpart public information, generating a master key for use in a data communication with the counterpart communication device.

2. The communication system of claim 1, wherein the client device receives one of the public key halves generated by counterpart communication device and the signed counterpart public information along with master key identification information from the counterpart communication device via the media route.

3. The communication system of claim 2, wherein the client device generates the master key identification information corresponding to the master key having been generated, the signed counterpart public information, and the master key having been generated by using the signed counterpart public information.

4. The communication system of claim 3, wherein the client device performs a verification of a master key possibly generated by the counterpart communication device through comparing between the master key identification information corresponding to the master key having been generated and the master key identification information received from the counterpart communication device.

5. The communication system of claim 4, wherein if the verification is performed on the master key possibly generated by the counterpart communication device, the client device transmits the master key identification information generated corresponding to the master key having been generated, via the media route to the counterpart communication device.

6. The communication system of claim 1, wherein the client device predicts a public key generated automatically by the counterpart communication device through operating an exclusive OR with respect to two public key halves received from the counterpart communication device via the signaling route and the media route.

7. The communication system of claim 1, wherein the client device generates one public key half of two public key halves made from the public keys having been generated automatically by applying a hash function to public information before being signed by the personal key generated automatically, and generates another public key half through operating an exclusive OR with respect to one of the public keys generated automatically and the one public key half generated automatically by applying the hash function.

8. The communication system of claim 1, wherein the client device generates Diffie-Hellman secure values, and uses generated Diffie-Hellman secure values for calculating public information to be signed by the personal key generated automatically.

9. The communication system of claim 1, wherein the client device performs verification on the public key having been predicted depending on whether the public key half received in the media route from the counterpart communication device is generated by applying a hash function to the signed counterpart public information, and uses the public key having been predicted and being complete with the verification to perform a verification of the signed counterpart public information.

10. A method for enabling a client device to share a security key for data communication with a counterpart communication device, the method comprising steps of:
dividing a public key generated by the client device into two public key halves;
transmitting one of the two divided public key halves in a signaling route to the counterpart communication device;
transmitting the other public key half and public information signed by a personal key generated automatically in a media route to the counterpart communication device;
predicting a public key generated automatically in the counterpart communication device by using two public key halves received from the counterpart communication device through the signaling route and the media route;
performing a verification of the predicted public key and signed counterpart public information having been received from the counterpart communication device in the media route; and
upon a successful verification of the predicted public key and the signed counterpart public information, generating a master key for use in a data communication with the counterpart communication device.

11. The method of claim 10, wherein one of the public key halves generated by counterpart communication device and the signed counterpart public information along with master key identification information are received from the counterpart communication device via the media route.

12. The method of claim 11, further comprising a step of generating the master key identification information corresponding to the master key having been generated, the signed counterpart public information, and the master key having been generated by using the signed counterpart public information.

13. The method of claim 12, further comprising a step of performing a verification of a master key possibly generated by the counterpart communication device through comparing between the master key identification information corresponding to the master key having been generated and the master key identification information received from the counterpart communication device.

14. The method of claim 13, further comprising a step of transmitting the master key identification information generated corresponding to the master key having been generated, via the media route to the counterpart communication device, if the verification is performed on the master key possibly generated by the counterpart communication device.

15. The method of claim 10, wherein the step of performing the prediction of the public key is a step of predicting a public key generated automatically by the counterpart communication device through operating an exclusive OR with respect to two public key halves received from the counterpart communication device via the signaling route and the media route.

16. The method of claim 10, wherein the step of halving the public keys includes generating one public key half of two public key halves made from the public keys having been generated automatically by applying a hash function to public information before being signed by the personal key generated automatically, and generating another public key half through operating an exclusive OR with respect to one of the public keys generated automatically and the one public key half generated automatically by applying the hash function.

17. The method of claim 10, wherein the public information to be signed by the personal key generated automatically is calculated by generating Diffie-Hellman secure values, and using generated Diffie-Hellman secure values.

18. The method of claim 10, wherein the step of performing the verification includes performing verification on the public key having been predicted depending on whether the public key half received in the media route from the counterpart communication device is generated by applying a hash function to the signed counterpart public information, and using the public key having been predicted and being complete with the verification to perform a verification of the signed counterpart public information.

* * * * *